(12) United States Patent
Ikeno et al.

(10) Patent No.: US 7,697,119 B2
(45) Date of Patent: Apr. 13, 2010

(54) RANGE IMAGE GENERATING APPARATUS

(75) Inventors: Ryohei Ikeno, Tokyo (JP); Tadashi Kawata, Tokyo (JP); Hideki Urabe, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 12/268,487

(22) Filed: Nov. 11, 2008

(65) Prior Publication Data

US 2009/0122297 A1 May 14, 2009

(30) Foreign Application Priority Data

Nov. 14, 2007 (JP) ............................. 2007-295659

(51) Int. Cl.
*G01C 3/08* (2006.01)
*G06K 9/20* (2006.01)
(52) U.S. Cl. ...................... 356/4.07; 356/4.01; 382/106
(58) Field of Classification Search ................ 356/4.01, 356/4.07, 5.01, 5.15; 382/106, 107
See application file for complete search history.

(56) References Cited

U.S. PATENT DOCUMENTS

| | | | | |
|---|---|---|---|---|
| 4,413,904 A | * | 11/1983 | Hamada et al. ............ 356/5.11 |
| 4,830,486 A | * | 5/1989 | Goodwin ................... 356/4.09 |
| 4,986,653 A | * | 1/1991 | Yokokura et al. .......... 356/5.15 |
| 5,889,490 A | * | 3/1999 | Wachter et al. ............. 342/127 |
| 7,119,350 B2 | | 10/2006 | Hashimoto et al. |
| 7,315,355 B2 | * | 1/2008 | Sperber ..................... 356/5.11 |
| 7,453,511 B2 | * | 11/2008 | Numazaki et al. ........... 348/342 |
| 7,486,804 B2 | * | 2/2009 | Nakamura et al. .......... 382/106 |
| 2005/0145773 A1 | | 7/2005 | Hashimoto et al. |
| 2007/0182949 A1 | * | 8/2007 | Niclass ......................... 356/3 |
| 2009/0079955 A1 | * | 3/2009 | Tsunesada et al. ......... 356/4.01 |

FOREIGN PATENT DOCUMENTS

| | | |
|---|---|---|
| JP | 2004-32682 A | 1/2004 |
| WO | WO 03/085413 A2 | 10/2003 |
| WO | WO 2006118286 A1 * | 11/2006 |

* cited by examiner

*Primary Examiner*—Isam Alsomiri
(74) *Attorney, Agent, or Firm*—Frishauf, Holtz, Goodman & Chick, P.C.

(57) ABSTRACT

A range image generating apparatus capable of preventing or reducing generation of range images with interference, which contain e.g., pixels with erroneous distance values is provided. The range image generating apparatus includes: a light source radiating a light; an image pickup element; a range image generating unit; a frequency changing unit that changes a modulation frequency for each frame rate or charge storage time; and a control unit that controls the light source and the image pickup element in synchronization with the modulation frequency changed by the frequency changing unit.

11 Claims, 7 Drawing Sheets

RANGE IMAGE GENERATING APPARATUS

BACKGROUND OF THE INVENTION

1. Field of the Invention

The present invention relates to a range image generating apparatus, and specifically relates to a range image generating apparatus capable of preventing or reducing generation of range images with interference, which include, e.g., pixels with erroneous distance values.

2. Description of the Related Art

Conventionally, there has been known a range image generating apparatus that generates a range image whose pixel values are distance values, by radiating modulated light from a light source, receiving light reflected by an object and converting the light into charges by means of photoelectric conversion elements, distributing the charges converted by the photoelectric conversion elements into a plurality of charge storage units in synchronization with modulation of the light source, and performing a predetermined calculation based on the charges stored in the plurality of charge storage units (for example, see Japanese Patent Application Laid-Open No. 2004-32682).

However, in this type of range image generating apparatus, the distances are measured by radiating modulated light and obtaining the phase difference between the modulated light and the reflected light. Accordingly, if there is another range image generating apparatus in an imaging range, the range image generating apparatus will directly receive modulated light radiated from that other range image generating apparatus. At that time, if the modulation frequency of the modulated light radiated from the own range image generating apparatus and the modulation frequency of the modulated light radiated from the other range image generating apparatus are the same, the own range image generating apparatus may erroneously detect a phase difference of an incident light containing the modulated light radiated from the light source of the other range image generating apparatus and a reflected light components of the modulated light radiated from the light source of the other range image generating apparatus, resulting in generation of a range image including pixels with erroneous distance values (hereinafter, also referred to as a "range image with interference").

SUMMARY OF THE INVENTION

The present invention has been made in view of the aforementioned circumstances, and an object of the present invention is to provide a range image generating apparatus capable of preventing or reducing generation of range images with interference, which contain, e.g., pixels with erroneous distance values.

In order to achieve the above object, a range image generating apparatus according to a first aspect of the present invention includes: a light source that radiates modulated light to a target space; an image pickup element including a plurality of photoelectric conversion elements that receive reflected light radiated from the light source and reflected by an object in the target space and converts the reflected light into charges, a plurality of charge storage units provided for the respective photoelectric conversion elements, and a distribution unit that distributes the charges converted by the photoelectric conversion elements into the plurality of charge storage units in synchronization with modulation of the light source; a range image generating unit that performs a predetermined arithmetic operation based on the charges stored in the plurality of charge storage units and generates a range image whose pixel values are distance values; a frequency changing unit that changes a modulation frequency for each frame rate or charge storage time; and a control unit that controls the light source and the image pickup element in synchronization with the modulation frequency changed by the frequency changing unit.

Since the range image generating apparatus according to the first aspect of the invention includes a frequency changing unit that changes a modulation frequency for performing synchronous control of the light source and the image pickup element for each frame rate or charge storage time, the probability of the modulation frequencies of modulated lights radiated from the own range image generating apparatus and another range image generating apparatus being the same is extremely small. Accordingly, the range image generating apparatus according the first aspect enables prevention or reduction of generation of range images with interference, which include erroneous distance values.

According to a second aspect of the present invention, in the range image generating apparatus according to the first aspect of the invention, the frequency changing unit changes the modulation frequency randomly or according to a certain rule.

Since in the second aspect of the invention, a modulation frequency for performing synchronous control of the light source and the image pickup element is changed randomly or according to a certain rule, the probability of the modulation frequencies of modulated lights radiated from the own range image generating apparatus and another range image generating apparatus becoming the same, resulting in generation of a range image with interference is extremely small. In other words, the range image generating apparatus according to the second aspect enables prevention or reduction of generation of range images with interference, which include erroneous distance values.

According to a third aspect of the present invention, in the range image generating apparatus according to the second or third aspect of the invention, the frequency changing unit changes the modulation frequency to a frequency obtained by adding or subtracting a frequency that is an integral multiple of a frame rate or light storage time to or from a predetermined reference modulation frequency.

Since in the third aspect of the invention, the modulation frequency for performing synchronous control of the light source and the image pickup element is changed to a frequency obtained by adding or subtracting a frequency that is an integral multiple of a frame rate (or light storage time) to or from a predetermined reference modulation frequency, the relationship between the modulation frequency $f_t$ of modulated light radiated from the own range image generating apparatus and the modulation frequency $f_s$ of modulated light radiated from another range image generating apparatus satisfies the relationship of $f_t-f_s=\pm$frame rate R×n (wherein n is an integer of no less than 1). When this relationship is satisfied, charges generated by modulated light radiated from the other range image generating apparatus and entering the own range image generating apparatus (image pickup element) are evenly distributed into the respective charge storage units by means of tens of thousands to hundreds of thousands of cycles of charge distributions for one whole frame. Thus, modulated light radiated from the other range image generating apparatus and entering the own range image generating apparatus (image pickup element) can be equated to uniform background light. Accordingly, even when modulation light radiated from the other range image generating apparatus enters the own range image generating apparatus (image pickup element), a range image with correct distance values can be generated without being affected by the modulated light radiated from the other range image generating apparatus as long as the above relationship is satisfied.

According to a fourth aspect of the present invention, the range image generating apparatus according to any of the first to third aspects of the invention further includes a determination unit that compares a plurality of range images generated by the range image generating unit during successive times with each other, and when at least one range image from among the plurality of range images includes a pixel indicating a finite value and a pixel in another range image, which is at the same position as the pixel indicating a finite value, indicates infinity or non-measurability, determines the pixel indicating a finite value to be a pixel indicating a value for a light source of the other range image.

According to the fourth aspect of the invention, when at least one range image from among a plurality of range images includes a pixel indicating a finite value and a pixel in another range image, which is at the same position as the pixel indicating a finite value, indicates infinity or non-measurability, the pixel indicating a finite value can be determined to be a pixel indicating a value for a light source of the other range image generating apparatus.

According to a fifth aspect of the invention, the range image generating apparatus according to the fourth aspect of the invention further includes a replacing unit that replaces the distance value of the pixel determined by the determination unit to be a pixel indicating a value for the light source of the other range image generating apparatus with a distance value of a pixel spatially adjacent to the pixel.

According to the fifth aspect of the invention, even if the modulation frequencies of modulated lights from the own range image generating apparatus and the other range image generating apparatus is the same, resulting in generation of a range image with interference, a proper range image can be obtained since the distance value of a pixel determined to be a pixel indicating a value for the light source of the other range image generating apparatus is replaced with the distance value of a pixel spatially adjacent to the pixel.

According to a sixth aspect of the present invention, the range image generating apparatus according to any of the first to third aspects of the invention further includes a determination unit that compares a plurality of range images generated by the range image generating unit during successive times with each other, and when at least one range image from among the plurality of range images includes a pixel with a distance value considerably different from an actual distance or a non-measurable pixel and a pixel in another range image, which is at the same position as the pixel with a distance value considerably different from an actual distance or the non-measurable pixel, indicates a proper distance value, determines the pixel with a distance value considerably different from an actual distance or the non-measurable pixel to have been interfered with.

According to the sixth aspect of the invention, when at least one range image from among a plurality of range images includes a pixel with a distance value considerably different from an actual distance or a non-measurable pixel, and a pixel in another range image, which is at the same position as the pixel with a distance value considerably different from an actual distance or the non-measurable pixel, indicates a proper value, the pixel with a distance value considerably different from an actual distance or the non-measurable pixel can be identified as a pixel having been interfered with.

According to a seventh aspect of the present invention, the range image generating apparatus according to the sixth aspect of the invention further includes a replacing unit that replaces the distance value of the pixel determined to have been interfered with by the determination unit, with a distance value of a pixel temporally adjacent to the pixel.

According to the seventh aspect of the invention, even if the modulation frequencies of modulated lights from the own range image generating apparatus and another range image generating apparatus are the same, resulting in generation of a range image with interference, a proper range image can be obtained since the distance value of the pixel determined to have been interfered with by an object is replaced with the distance value of a pixel temporally adjacent to the pixel.

In addition, the range image generating apparatus according to the fourth aspect of the invention can be specified as follows.

The range image generating apparatus according to any of the first to third aspects of the invention, further comprising a determination unit that compares a plurality of (at least two or three) range images generated by the range image generating unit during successive times with each other, and determines, from among pixels indicating finite values in one of the range images (a given range image), a pixel at the same position indicates infinity or non-measurability in another range image (a range image other than the given range image from among the plurality of range image) to be a pixel indicating a value for a light source of the other range image generating apparatus.

According to this aspect, from among pixels indicating finite values in one of the range images, a pixel at the same position in another range image indicates infinity or non-measurability (a pixel indicating an abnormal value as a result of interference) can be determined to be a pixel indicating a value for the light source of the other range image generating apparatus.

The range image generating apparatus according to the sixth aspect of the invention can also be specified as follows.

The range image generating apparatus according to any of the first to third aspects of the invention, further comprising a determination unit that compares a plurality of (at least two or three) range images generated by the range image generating unit during successive times) with each other, and determines, from among pixels with distance values considerably different from actual distances or non-measurable pixels in one range image (a given range image), a pixel at the same position in another range image (range image other than the given range image from among the plurality of range images) with a proper distance value to be a pixel having been interfered with by an object.

According to this aspect, from among pixels with distance values considerably different from actual distances or non-measurable pixels in one range image (a given range image), a pixel at the same position in another range image (range image other than the given range image from among the plurality of range images) having a proper distance value can be determined to be a pixel having been interfered with by an object.

The aspects of the present invention enable provision of a range image generating apparatus capable of preventing or reducing generation of range images with interference, which contain, e.g., pixels with erroneous distance values.

DETAILED DESCRIPTION OF THE PREFERRED EMBODIMENTS

Hereinafter, a range image generating apparatus according to an embodiment of the present invention will be described with reference to the drawings.

Figure 1:
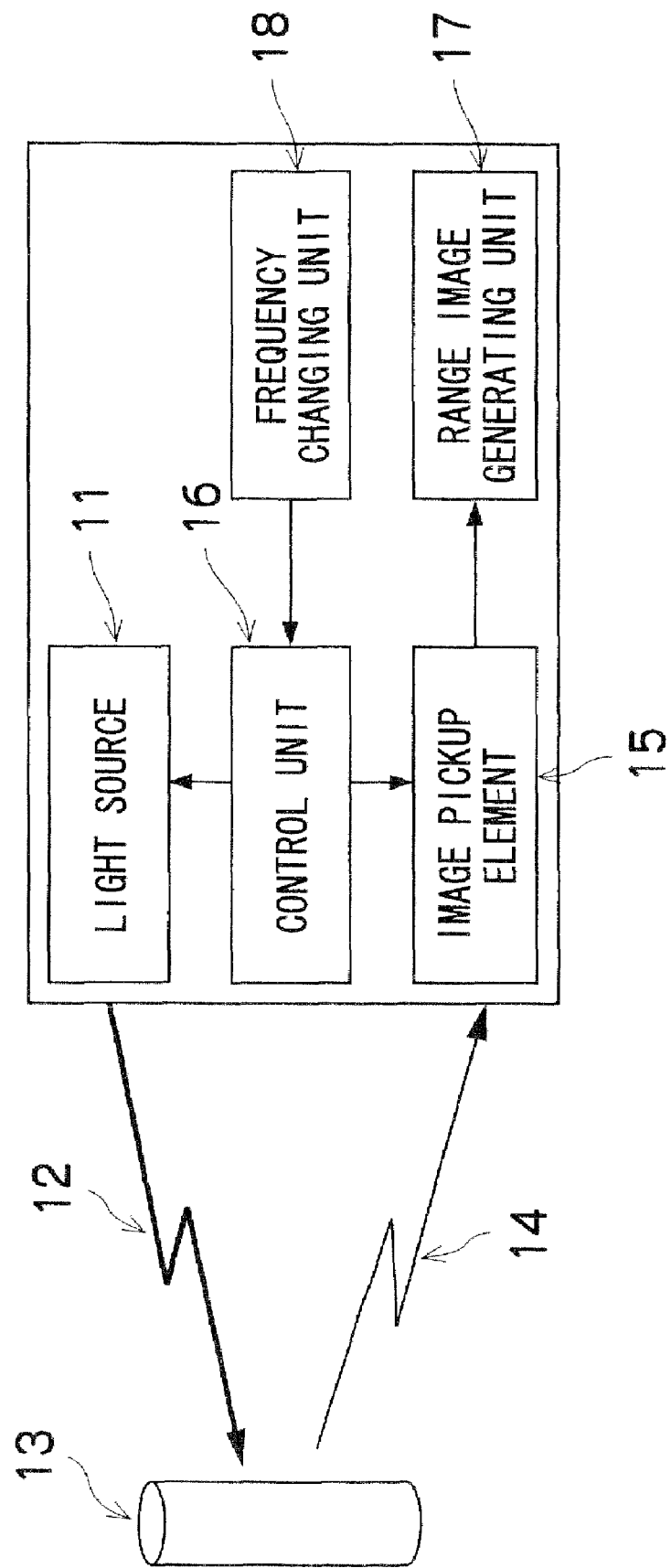
FIG. 1 is a block diagram of a range image generating apparatus according to an embodiment of the present invention.

FIG. 1 is a block diagram of a range image generating apparatus according to a first embodiment. As shown in FIG. 1, a range image generating apparatus 1, which is to be mounted in a vehicle such as an automobile, includes a time of light flight-type range image sensor 10 (hereinafter, referred to as the "range image sensor 10"). The range image sensor 10 includes, e.g., a light source 11, an image pickup element 15, a control unit 16, a range image generating unit 17, a frequency changing unit 18.

The light source 11 is a light source that radiates modulated light to a target space (for example, infrared light or visible light rapidly modulated by means of sine wave or rectangular wave, etc.), and a device that can perform high-speed modulation, such as an LED, is used for the light source 11. The image pickup element 15 includes: e.g., a plurality of photoelectric conversion elements (also referred to as pixels); a plurality of charge storage units provided to the respective photoelectric conversion elements, and a distribution unit that distributes charges converted by the photoelectric conversion elements into the plurality of charge storage units, in synchronization with the modulation of the light source 11 (all not shown). The photoelectric conversion elements receive reflected light 14 radiated from the light source 11 and reflected by an object existing in a target space and convert the reflected light 14 into charges. The distribution unit distributes the charges converted by the photoelectric conversion elements into the plurality of charge storage units, in accordance with a synchronization signal from the control unit 16 at high speed. The range image generating unit 17 performs a predetermined arithmetic operation based on the distributed charges to calculate the phase difference between the modulated light from the light source 11 and the reflected light, thereby generating a range image whose pixel values are distance values.

Figure 2:
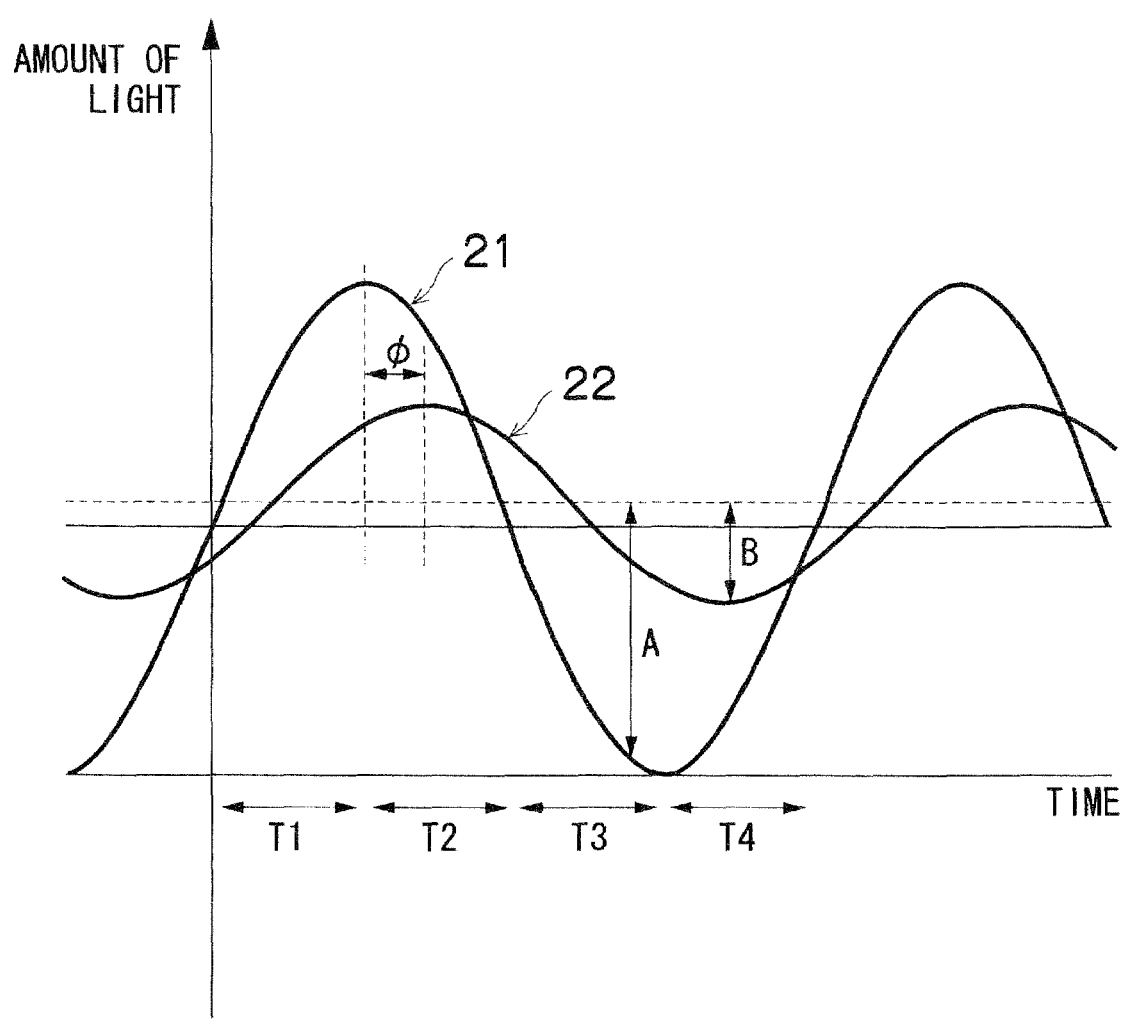
FIG. 2 is a diagram for describing a principle of generating a range image.

FIG. 2 is a diagram for describing a principle of generating a range image. In FIG. 2, a sine wave 21 indicates modulated light radiated from the light source 11, and a sine wave 22 indicates reflected light reflected by an object existing in a target space and entering the image pickup element 15 from the modulated light radiated from the light source 11. The phase difference φ between the sine wave 21 and the sine wave 22 indicates a delay caused by the time of light flight to and from the object.

In FIG. 2, one cycle of modulation of the light source 11 is divided into four terms and charges are distributed into four charge storage units. Where the respective terms are T1, T2, T3 and T4, and the amounts of charges stored in the respective terms are C1, C2, C3 and C4, the phase difference φ can be expressed by the following formula.

$$\phi = \mathrm{Tan}^{-1}\left(\frac{C1 - C3}{C2 - C4}\right) \qquad \text{[Formula 1]}$$

Since the speed of light is known, the distance to the object can be obtained by calculating this phase difference φ, enabling generation of a range image whose pixel values are distance values.

An average charge amount A, which is used for ordinary image data, can be expressed by the following formula.

$$A = \frac{C1 + C2 + C3 + C4}{4} \qquad \text{[Formula 2]}$$

Also, the amplitude amount B of the modulated light component reflected by the object is expressed by the following formula.

$$B = \frac{\sqrt{(C1 - C3)^2 + (C2 - C4)^2}}{2} \qquad \text{[Formula 3]}$$

Generally, the modulation frequency of a light source is tens of MHz, and accordingly, one cycle of modulation is around tens of ns. Thus, in order to obtain a range image, hundreds to hundreds of thousands of cycles of charge storage time are required.

According to the above-described principle, the range image generating unit 17 generates a range image whose pixel values are distance values.

Figure 3:
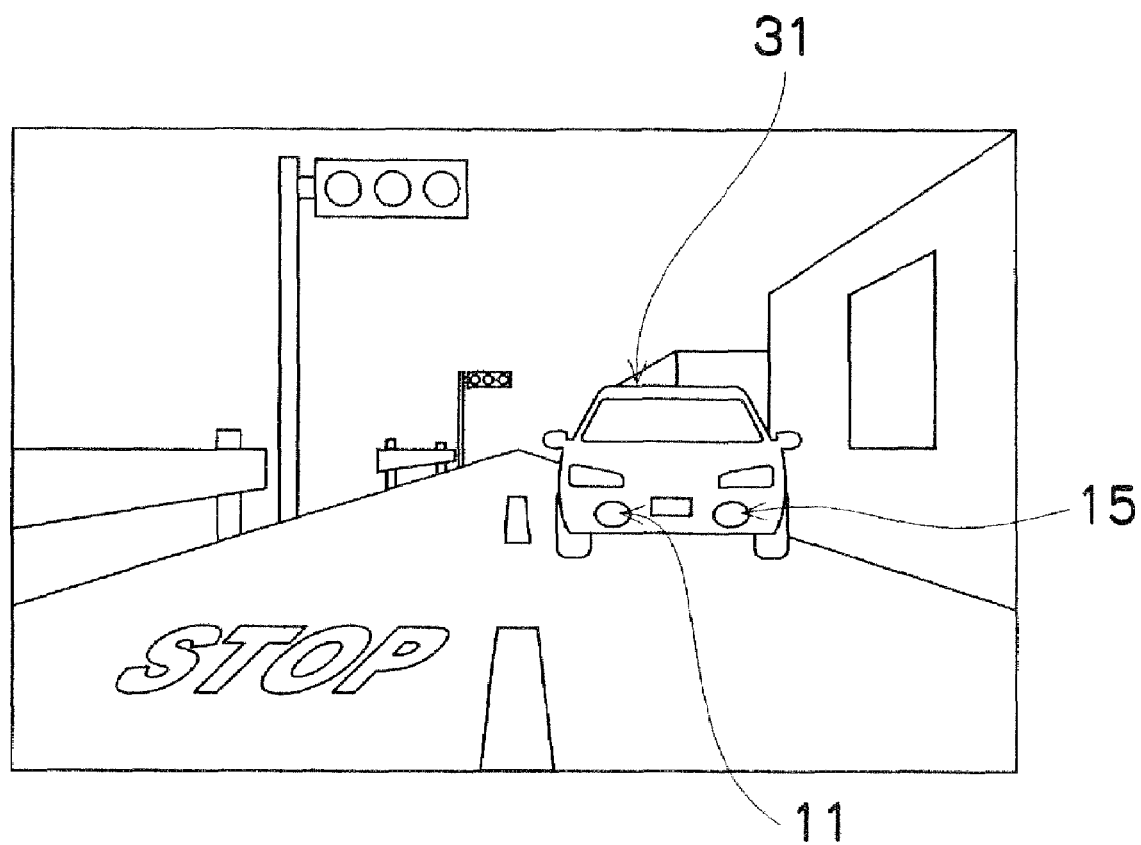
FIG. 3 shows an example in which (a light source 11) of another vehicle exists in an imaging range of an image pickup element 15.
Figure 4:
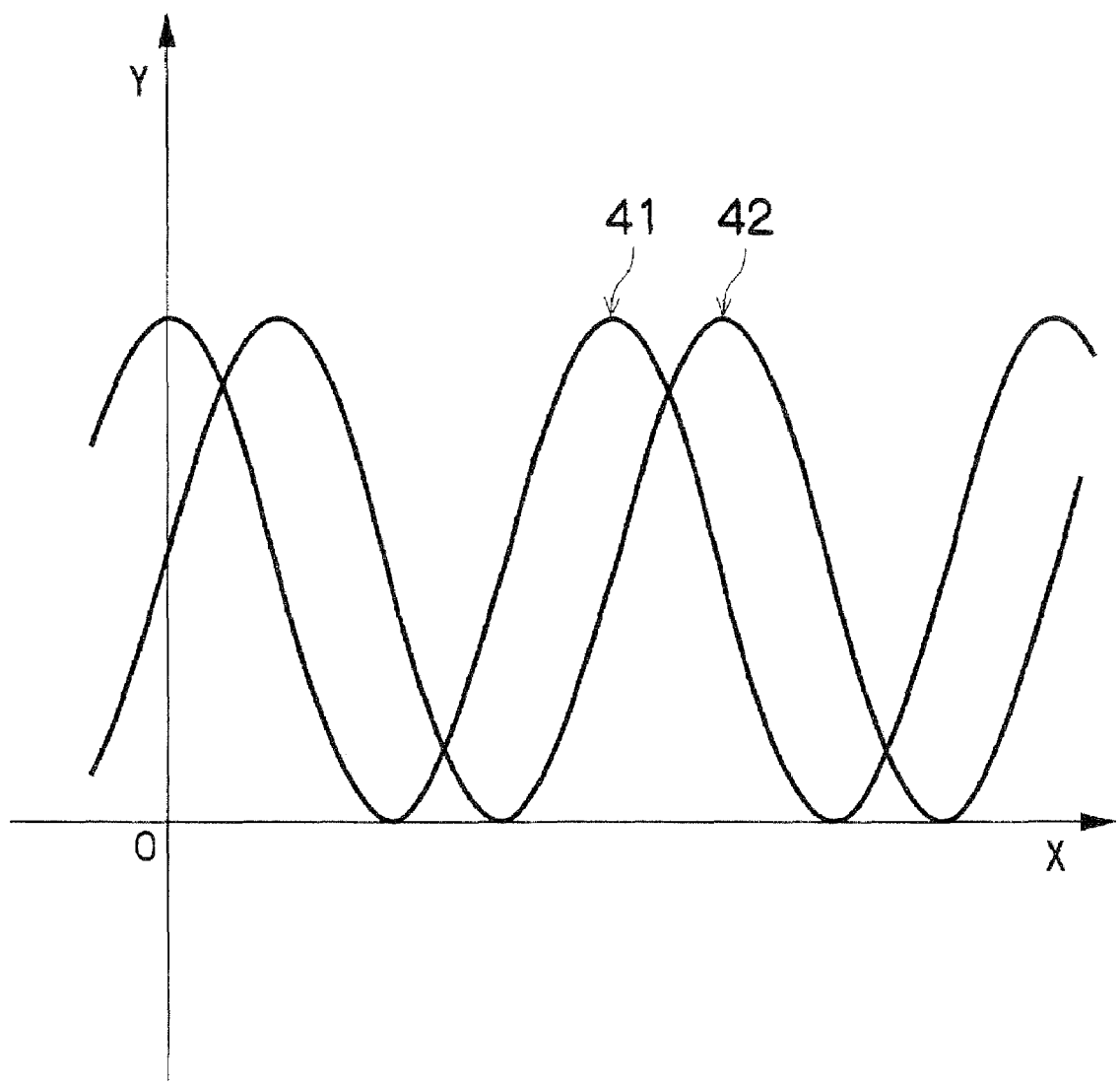
FIG. 4 is a diagram for describing not only reflected light radiated from (a light source 11 of) an own vehicle and reflected by (a light source 11 of) another vehicle 31, but also modulated light 42 (direct light) radiated from (the light source 11 of) the other vehicle 31 entering an image pickup element 15.

However, as shown in FIG. 3, when (a light source 11 of) another vehicle 31 with a range image generating apparatus 1 mounted therein exists in the imaging range of the image pickup element 15 (e.g., the opposing lane) and modulated light with the same modulation frequency is radiated from (a light source 11 of) the other vehicle 31, as shown in FIG. 4, not only reflected light radiated from (the light source 11 of) the own vehicle and reflected by (the light source 11 of) the other vehicle 31, but also modulated light 42 (direct light) radiated from (the light source 11 of) the other vehicle 31 enter the image pickup element 15. In FIG. 4, a sine wave 41 indicates modulated light radiated from (the light source 11 of) the own vehicle. The reflected light radiated from (the light source 11 of) the own vehicle and reflected by (the light source 11 of) the other vehicle 31 is so small that the reflected light can be ignored, compared to the modulated light 42 radiated from (the light source 11 of) the other vehicle 31. Therefore, the range image generating unit 17 erroneously calculates the phase difference between the modulated light radiated from (the light source 11 of) the own vehicle and the modulated light 42 radiated from (the light source 11 of) the other vehicle and generates a range image including pixels with finite and erroneous distance values (hereinafter, also referred to as "range image with interference").

Figure 5:
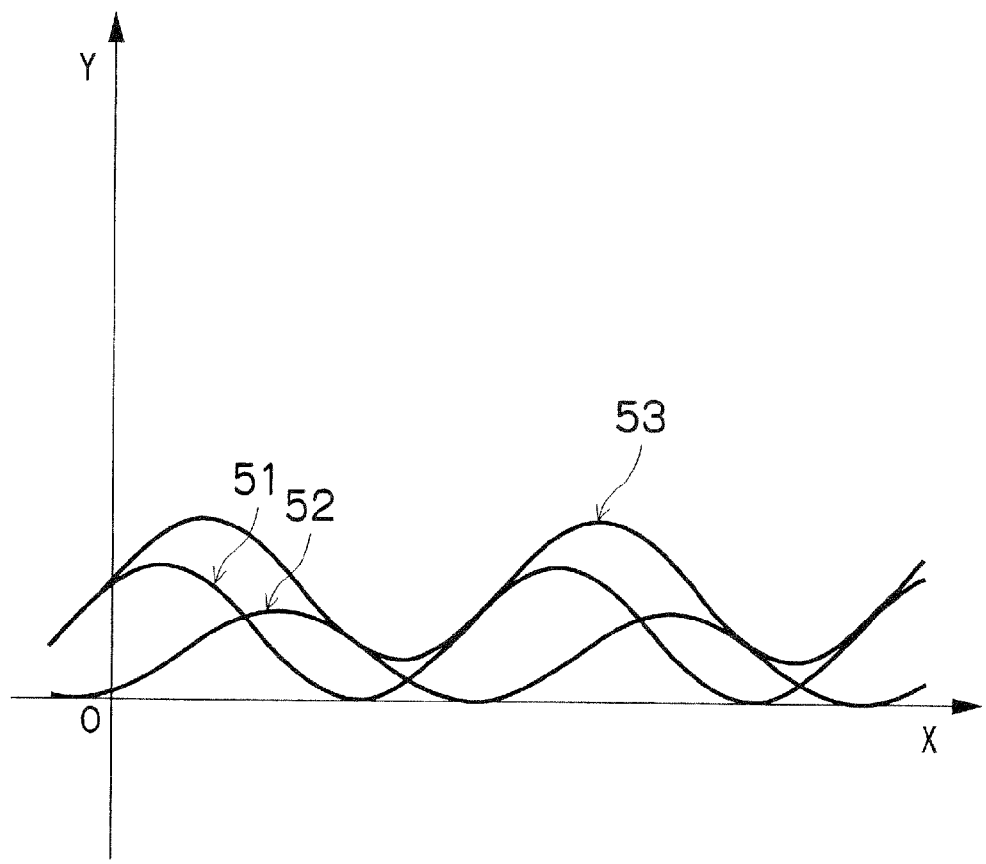
FIG. 5 is a diagram for describing, not only reflected light 51 radiated from (a light source 11 of) an own vehicle reflected by a certain object, but also reflected light 52 radiated from (a light source 11 of) another vehicle and reflected by the same object entering an image pickup element 15.

Also, as shown in FIG. 3, when (a light source 11 of) another vehicle 31 with a range image generating apparatus 1 mounted therein exists in the imaging range of the image pickup element 15 (e.g., the opposing lane) and modulated light with the same modulation frequency is radiated from (the light source 11 of) the other vehicle 31, as shown in FIG. 5, not only reflected light 51 radiated from (the light source 11 of) the own vehicle and reflected by a certain object, but also reflected light 52 radiated from (the light source 11 of) the other vehicle and reflected by the same object enter the image pickup element 15. In this case, the range image generating unit 17 erroneously calculates the phase difference between the modulated light radiated from (the light source 11 of) the own vehicle and a composite wave 53 of the reflected light 51 and the reflected light 52, and generates a range image including pixels with distance values considerably different from the actual distances or non-measurable pixels (hereinafter, also referred to as "range image with interference").

As described above, when (a light source 11 of) another vehicle 31 with a range image generating apparatus 1 mounted therein exists in the imaging range of the image pickup element 15 (e.g., the opposing lane) and modulated light with the same modulation frequency is radiated from (the light source 11 of) the other vehicle 31, there is a possibility that a range image with correct distance values cannot be generated. In order to solve this problem, the range image generating apparatus 1 according to the present embodiment includes the frequency changing unit 18.

The frequency changing unit 18 changes the modulation frequency to a frequency obtained by the reference modulation frequency ± an integral multiple of the frame rate, for each predetermined frame rate (or charge storage time) and notifies the control unit 16 of the modulation frequency after the change (randomly or according to a certain rule). The control unit 16 controls the light source 11 and the image pickup element 15 in synchronization with the modulation frequency after the change.

As described above, since the modulation frequency is changed to a frequency obtained by the reference modulation frequency ± an integral multiple of the frame rate, for each predetermined frame rate (or charge storage time), the probability of the modulation frequencies of the modulated light radiated from (the light source 11) of the own vehicle and the modulated light radiated from (the light source 11 of) the other vehicle 31 being the same becomes extremely small. Accordingly, it becomes possible to prevent or reduce generation of range images with interference, which include, e.g., pixels with erroneous distance values.

The probability of the modulation frequencies of both modulated lights being the same, resulting in generation of a range image with interference is a thirty-three thousand, three hundred and thirty-third (around one frame in 20 minutes) when, e.g., the reference modulation frequency is set to 10 MHz, the frame rate is set to 30 Hz, and the frequency fluctuation range is set to 9.5 MHz to 10.5 MHz as described later.

Figure 6:
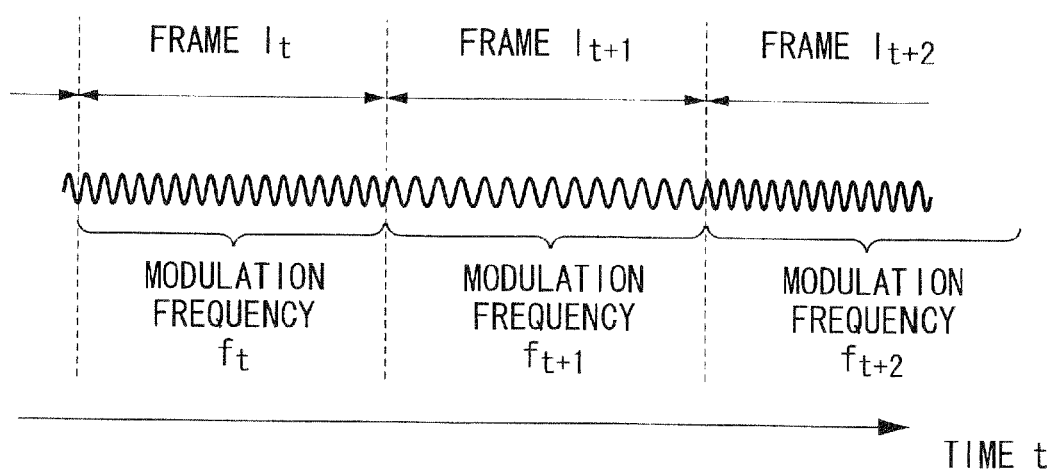
FIG. 6 is a diagram for describing the same distance being able to be measured for each frame with regard to the same object even when the modulation frequency is changed for each frame rate (or charge storage time)

As described above, even when the modulation frequency is changed for each predetermined frame rate (or charge storage time), the same distance can be measured for each frame with regard to the same object. FIG. 6 is a diagram for describing this. As shown in FIG. 6, where the modulation frequency of a certain frame $I_t$ is $f_t$, the phase difference between the modulated light and the reflected light from an object existing at a certain distance, which has been obtained in this frame $I_t$, is $\phi_t$, the modulation frequency of the next frame $I_{t+1}$ is $f_{t+1}$, and the phase difference between the modulated light and the reflected light from the same object, which has been obtained in this frame $I_{t+1}$, is $\phi_{t+1}$, the measured distance L for each frame can be expressed by the following formula.

$$L_t = \frac{C \times \phi_t}{f_t \times 2\pi} \qquad \text{[Formula 4]}$$

$$L_{t+1} = \frac{C \times \phi_{t+1}}{f_{t+1} \times 2\pi} \qquad \text{[Formula 5]}$$

Since the frames $I_t$ and $I_{t+1}$ are different from each other in modulation frequency, the phase differences $\phi_t$ and $\phi_{t+1}$ between the modulated light and the respective reflected lights from the object existing at a certain distance are different from each other. However, the measured distances $L_t$ and $L_{t+1}$ are the same value.

However, the modulation frequency should be changed within the range in which the measurement target object is sufficiently included in the distance measurement range (e.g., 9.5 MHz to 10.5 MHz). This is because the modulation frequency is inversely proportional to the distance measurement range, if the modulation frequency is considerably changed, the distance measurement range will also be considerably changed for each frame. The distance measurement ranges when the modulation frequency is 9.5 MHz and 10.5 MHz are 0 to 15.79 m and 0 to 14.29 m, respectively.

As described above, since the modulation frequency is changed to a frequency obtained by the reference modulation frequency ± an integral multiple of the frame rate R, the relationship of $f_t - f_s = \pm$ the frame rate R×n (however, $f_t$ is a modulation frequency for the own vehicle, $f_s$ is a modulation frequency for the other vehicle 31, and n is an integer of no less than 1). When this relationship is satisfied, charges generated by modulated light radiated from (the light source 11 of) the other vehicle 31 and entering the image pickup element 15 is evenly distributed into the respective charge storage units by means of tens of thousands to hundreds of thousands of cycles of charge distributions for one whole frame. Thus, the modulated light radiated from (the light source 11 of) the other vehicle 31 and entering the image pickup element can be equated to be uniform background light. Accordingly, even when the modulated light radiated from (the light source 11 of) the other vehicle 31 enters the range image generating unit 17, the range image generating unit 17 can generate a range image with correct distance values without being affected by the modulate light radiated from (the light source 11 of) the other vehicle 31 as long as the above relationship is satisfied.

However, as described above, even when the modulation frequency is changed to a frequency obtained by the reference modulation frequency ± an integral multiple of the frame rate, for each predetermined frame rate R (or charge storage time), the modulation frequencies of both modulated lights become the same with a certain probability, resulting in generation of a range image with interference.

Figure 7:
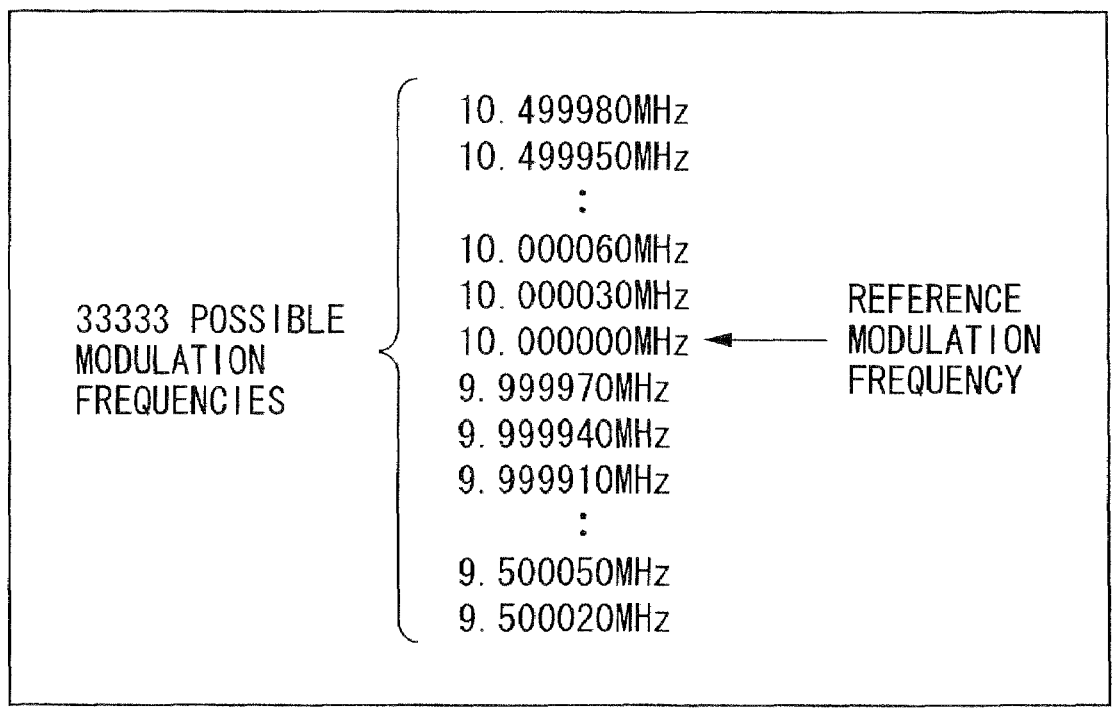
FIG. 7 is a diagram for describing the range of modulation frequencies provided by a frequency changing unit 18.

For example, when the reference modulation frequency is set to 10 MHz, the frame rate R is set to 30 Hz and the frequency fluctuation range is set to 9.5 to 10.5 MHz, as shown in FIG. 7, the frequency changing unit 18 can be changed to a modulation frequency that is any of 33333 possible modulation frequencies. In this case, the probability of the modulation frequency being the same as the modulated light radiated from (the light source 11 of) the other vehicle 31 is a thirty-three thousand, three hundred and thirty-third (around one frame in 20 minutes). In other words, when the reference modulation frequency is set to 10 MHz, the frame rate R is set to 30 Hz, and the range in which the target object is sufficiently included in the distance measurement range is set to 9.5 MHz to 10.5 MHz, the range image generating unit 17 may generate a range image with interference, which includes pixels with incorrect finite distance values, at a rate of around one frame per 20 minutes.

However, even when a distance value with interference, which includes pixels with incorrect finite distance values, the frequency changing unit 18 changes the modulation frequency for each frame rate R (or charge storage time), and accordingly, the modulation frequency is changed over time, and modulated light (direct light) with a different modulation frequency radiated from (the light source 11 of) the other vehicle enters the image pickup element. Charges generated by the modulated light with the different modulation frequency radiated from (the light source 11 of) the other vehicle is evenly distributed into the respective charge storage units, and accordingly intense uniform light is detected. Thus, subsequent to the range image including pixels with incorrect finite distance values, the range image generating unit 17 generates a range image including infinite or non-measurable pixels.

Accordingly, by focusing on change between pixels (distance values) at the same position in temporally-successive frames (i.e., change from an incorrect finite distance to infinity or non-measurability), a range image with interference including pixels with incorrect finite distance values can be detected.

Figure 8:
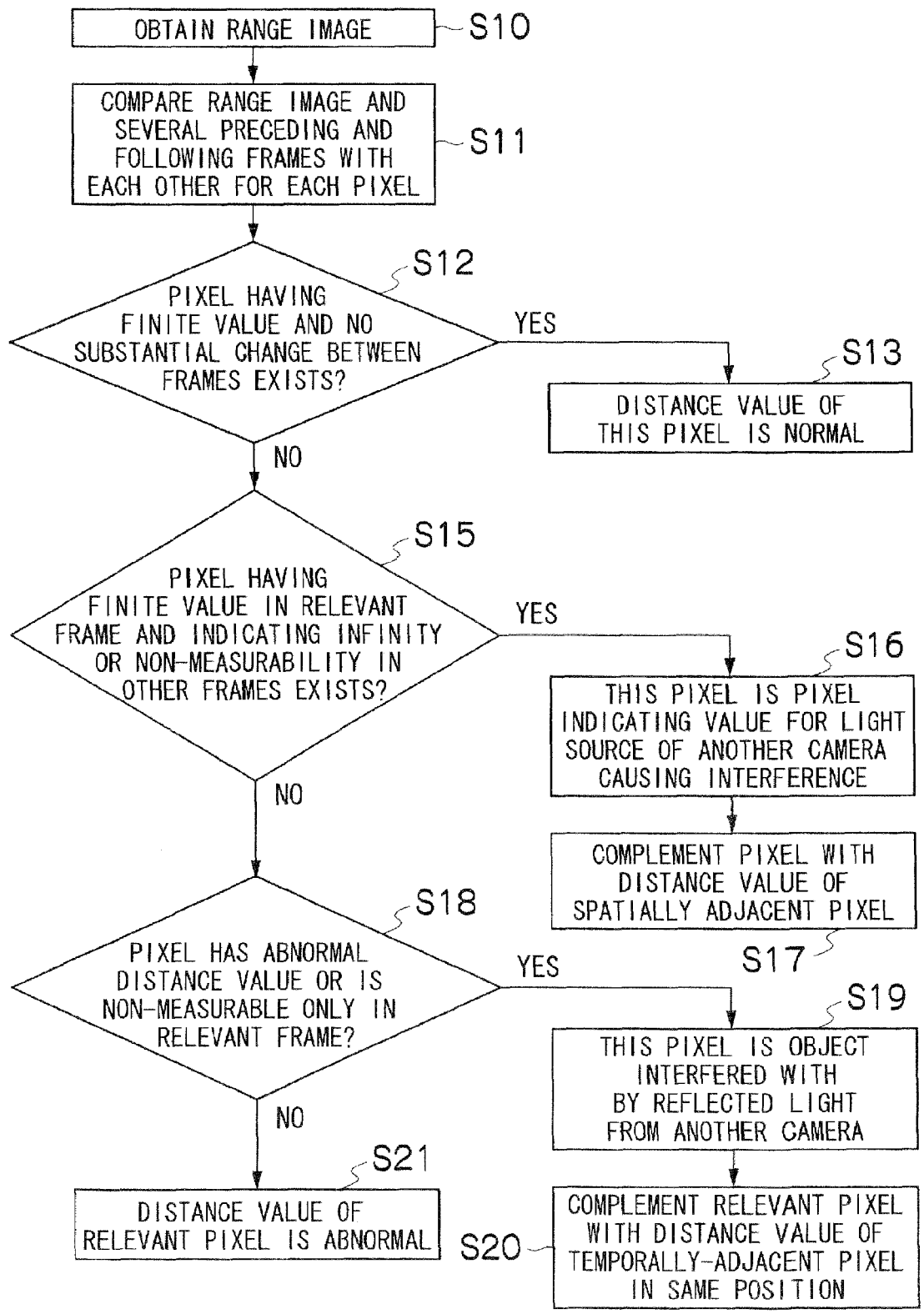
FIG. 8 is a flowchart for describing an operation example of a range image generating apparatus 1 according to an embodiment of the present invention.

For example, as shown in FIG. 8, each time a range image is generated by the range image generating unit 17 (step S10), the generated range image and frames (range images) preceding and following the range image are compared with each other for each pixel (step S11), and whether or not there is a pixel having a finite distance value and no large change (considerable change) from the preceding and following frames, in the range image generated at step S10 is determined (step S12). If such pixel exists (step S12: Yes), the distance value of the pixel is determined to be normal (step S13).

Meanwhile, if such pixel does not exist (step S12: No), whether or not, from among pixels indicating finite values in the range image generated at step S10 (corresponding to one of the range images in the fourth aspect of the present invention), a pixel in which a pixel at the same position in a frame preceding or following the range image (corresponding to another range image in the fourth aspect of the present invention) indicates infinity or non-measurability exists is determined (step S15). If such pixel exists (step S15: Yes), the range image generated at step S10 is determined to be a range image with interference, which includes a pixel with an incorrect finite distance value, and the pixel having a finite distance value in the range image generated at step S10 is determined to be a pixel indicating a value for the light source 11 of the other vehicle 31 causing the interference (step S16). Then, the pixel having a finite distance value in the range image generated at step S10 (that is, the pixel determined to be a pixel indicating a value for the light source 11 of the other vehicle 31 causing the interference) is complemented with the distance value of a pixel adjacent to the pixel in the range image generated at step S10 (spatially-adjacent pixel) (step S17). Accordingly, even if the modulation frequencies of the modulated lights radiated (the light source 11 of) the own vehicle and (the light source 11 of) the other vehicle are the same, resulting in generation of a range image with interference, which has pixels with incorrect finite distance values, a proper range image can be obtained.

Also, when the reference modulation frequency is set to 10 MHz, the frame rate is set to 30 Hz, and the range in which the target object is sufficiently included in the distance measurement range is set to 9.5 MHz to 10.5 MHz, the range image generating unit 17 may generate a range image with interference, which includes pixels with distance values considerably different from actual distances or non-measurable pixels at a rate of around one frame per 20 minutes.

However, even when a range image with interference, which includes pixels with distance values considerably different from actual distances or non-measurable pixels is generated, the frequency changing unit 18 changes the modulation frequency for each frame rate R (or charge storage time), and accordingly the modulation frequency is changed over time, and the modulated light with a different modulation frequency radiated from (the light source 11 of) the other vehicle 31 (reflected light reflected by a certain object) enters the image pickup element. Charges generated by the modulated light with the different modulation frequency radiated from (the light source 11 of) the other vehicle (reflected light reflected by a certain object) is evenly distributed into the respective charge storage units. Thus, subsequent to the range image with interference, which includes pixels with distance values considerably different from actual distances or non-measurable pixels, the range image generating unit 17 generates a range image with correct distance values.

Accordingly, focusing on change between pixels (distance values) at the same position in temporally-successive frames (i.e., change from an incorrect finite distance to infinity or non-measurability), a range image with interference, which includes pixels with distance values considerably different from actual distances or non-measurable pixels can be detected.

For example, as shown in FIG. 8, each time a range image is generated by the range image generating unit 17 (step S10), the generated range image and frames (range images) preceding and following the range image are compared with each other for each pixel (step S11). Then, whether or not, from among pixels with distance values considerably different from actual distances (abnormal distance values) or non-measurable pixels in the range image generated at step S10 (corresponding to one of the range images in the fourth aspect of the present invention), a pixel in which a pixel at the same position in a frame preceding or following the range image (corresponding to another range image in the fourth aspect of the present invention) has a proper distance value exists is determined (step S18). If such pixel exists (step S18: Yes), the range image generated at step S10 is determined to be a range image with interference, which includes a pixel with a distance value considerably different from an actual distance (abnormal distance value) or a non-measurable pixel, and the pixel with a distance value considerably different from an actual distance (abnormal distance value) or the non-measurable pixel in the range image generated at step S10 is determined to be an object with interference (step S19). For example, when at least three range images are compared with one another and pixels with similar distance values at the same position in at least two range images have distance values that are different from the distance value of the pixel at the same position in the other range image by no less than a certain threshold value, the pixel in the other range image is determined to be an object with interference. Then, the pixel with a distance value considerably different from an actual distance (abnormal distance value) or the non-measurable pixel in the range image generated at step S10 (that is, the pixel determined to be an object with interference) is complemented with the distance value of the pixel at the same position (temporally-adjacent pixel) in a frame preceding or following the range image generated at step S10 (step S20). Accordingly, even if the modulation frequencies of modulated lights radiated from (the light source 11 of) the own vehicle and (the light source 11) of the other vehicle are the same, resulting in generation of a range image with interference, which has pixels considerably different from actual distances (abnormal distance values) or non-measurable pixels is generated, a proper range image can be obtained, If such pixel does not exist (step S18: No), the distance values of these pixels are determined to be abnormal (step S21). The above-described processing at steps S11 to S21 is performed for each of the pixels in the range image generated at step S10.

As described above, since the range image generating apparatus 1 according to the present embodiment includes a frequency changing unit 18 that changes a modulation frequency for performing synchronous control of the light source 11 and the image pickup element 15 for each frame rate (or charge storage time), the probability of the modulation frequencies of modulated lights radiated from the own range image generating apparatus 1 (that is, the range image generating apparatus 1 mounted in the own vehicle) and the other range image generating apparatus 1 (that is, the range image generating apparatus 1 mounted in the other vehicle 31) being the same is extremely small. Accordingly, the range image generating apparatus 1 according to the present embodiment enables prevention or reduction of generation of range images with, e.g., incorrect distance values.

The above-described embodiment is a mere example in all respects. The present invention will not be interpreted to be limited by the description of the embodiment. The present invention can be carried out in various other modes without departing from the spirit or essential characteristics of the present invention.

For example, by providing a program causing a computer to perform the functions of the range image generating apparatus according to any of the embodiments and causing a computer on which the program is installed to execute the program, it is possible to implement the range image generating apparatus according to any of the embodiments. Further, by providing a recording medium on which the program causing a computer to perform the functions of the range image generating apparatus according to any of the embodiments is recorded, installing the program on a computer using the recording medium and causing the computer to execute the program, it is possible to implement the range image generating apparatus according to any of the embodiments.

What is claimed is:

1. A range image generating apparatus comprising:
a light source that radiates modulated light to a target space;
an image pickup element including: (i) a plurality of photoelectric conversion elements that receive reflected light radiated from the light source and reflected by an object in the target space and that convert the reflected light into charges, (ii) a plurality of charge storage units provided for the respective photoelectric conversion elements, and (iii) a distribution unit that distributes the charges converted by the photoelectric conversion elements into the plurality of charge storage units in synchronization with modulation of the light source;
a range image generating unit that performs a predetermined arithmetic operation based on the charges stored in the plurality of charge storage units and that generates a range image whose pixel values are distance values;
a frequency changing unit that changes a modulation frequency for each frame rate or charge storage time;
a control unit that controls the light source and the image pickup element in synchronization with the modulation frequency changed by the frequency changing unit; and
a determination unit that compares a plurality of range images generated by the range image generating unit at successive times with each other, and when at least one range image from among the plurality of range images includes a pixel indicating a finite value and when a pixel in another one of the range images, which is at a same position as the pixel indicating the finite value, indicates infinity or non-measurability, the determination unit determines the pixel indicating the finite value to be a pixel indicating a value for a light source of another range image generating apparatus.

2. The range image generating apparatus according to claim 1, wherein the frequency changing unit changes the modulation frequency to a frequency obtained by one of adding a frequency that is an integral multiple of a frame rate or light storage time to a predetermined reference modulation frequency, and subtracting the frequency from the predetermined reference modulation frequency.

3. The range image generating apparatus according to claim 1, wherein when at least one range image from among the plurality of range images includes a pixel with a distance value considerably different from an actual distance or a non-measurable pixel, and when a pixel in another one of the range images, which is at a same position as the pixel with the distance value considerably different from the actual distance or the non-measurable pixel, indicates a proper distance value, the determination unit determines the pixel with the distance value considerably different from the actual distance or the non-measurable pixel to have been interfered with.

4. The range image generating apparatus according to claim 3, further comprising a replacing unit that replaces the distance value of the pixel determined to have been interfered with by the determination unit, with a distance value of a pixel temporally adjacent to said pixel.

5. The range image generating apparatus according to claim 1, wherein the frequency changing unit changes the modulation frequency randomly or according to a certain rule.

6. The range image generating apparatus according to claim 5, wherein when at least one range image from among the plurality of range images includes a pixel with a distance value considerably different from an actual distance or a non-measurable pixel, and when a pixel in another one of the range images, which is at a same position as the pixel with the distance value considerably different from the actual distance or the non-measurable pixel, indicates a proper distance value, the determination unit determines the pixel with the distance value considerably different from the actual distance or the non-measurable pixel to have been interfered with.

7. The range image generating apparatus according to claim 5, wherein the frequency changing unit changes the modulation frequency to a frequency obtained by one of adding a frequency that is an integral multiple of a frame rate or light storage time to a predetermined reference modulation frequency, and subtracting the frequency from the predetermined reference modulation frequency.

8. The range image generating apparatus according to claim 7, further comprising a replacing unit that replaces the distance value of the pixel determined by the determination unit to be the pixel indicating the value for the light source of the other range image generating apparatus, with a distance value of a pixel spatially adjacent to said pixel.

9. The range image generating apparatus according to claim 7, wherein when at least one range image from among the plurality of range images includes a pixel with a distance value considerably different from an actual distance or a non-measurable pixel, and when a pixel in another one of the range images, which is at a same position as the pixel with the distance value considerably different from the actual distance or the non-measurable pixel, indicates a proper distance value, the determination unit determines the pixel with the distance value considerably different from the actual distance or the non-measurable pixel to have been interfered with.

10. The range image generating apparatus according to claim 9, further comprising a replacing unit that replaces the distance value of the pixel determined to have been interfered with by the determination unit, with a distance value of a pixel temporally adjacent to said pixel.

11. The range image generating apparatus according to claim 1, further comprising a replacing unit that replaces the distance value of the pixel determined by the determination unit to be the pixel indicating the value for the light source of the other range image generating apparatus, with a distance value of a pixel spatially adjacent to said pixel.

* * * * *